S. Z. DE FERRANTI.
PROCESS AND APPARATUS FOR THE INTERCONVERSION OF KINETIC AND POTENTIAL ENERGY IN FLUIDS.
APPLICATION FILED DEC. 16, 1907.

948,213.

Patented Feb. 1, 1910.

Inventor:
Sebastian Z. de Ferranti.

S. Z. DE FERRANTI.
PROCESS AND APPARATUS FOR THE INTERCONVERSION OF KINETIC AND POTENTIAL ENERGY IN FLUIDS.
APPLICATION FILED DEC. 16, 1907.

948,213.

Patented Feb. 1, 1910.
5 SHEETS—SHEET 3.

Inventor:
Sebastian Z. de Ferranti

S. Z. DE FERRANTI.
PROCESS AND APPARATUS FOR THE INTERCONVERSION OF KINETIC AND POTENTIAL ENERGY IN FLUIDS.
APPLICATION FILED DEC. 16, 1907.

948,213.

Patented Feb. 1, 1910.
5 SHEETS—SHEET 5.

UNITED STATES PATENT OFFICE.

SEBASTIAN ZIANI DE FERRANTI, OF GRINDLEFORD BRIDGE, NEAR SHEFFIELD, ENGLAND.

PROCESS AND APPARATUS FOR THE INTERCONVERSION OF KINETIC AND POTENTIAL ENERGY IN FLUIDS.

948,213.　　　　　　　Specification of Letters Patent.　　Patented Feb. 1, 1910.

Application filed December 16, 1907. Serial No. 406,802.

*To all whom it may concern:*

Be it known that I, SEBASTIAN ZIANI DE FERRANTI, a subject of the King of Great Britain and Ireland, and residing at Grindleford Bridge, near Sheffield, in the county of Derby, England, have invented certain new and useful Improvements in Processes and Apparatus for the Interconversion of Kinetic and Potential Energy in Fluids, of which the following is a specification.

This invention relates to the conversion of the kinetic energy of a fluid more or less into potential energy by means of nozzles, and is applicable in fluid compressors, injectors, ejectors, pumps, and in many other kinds of appliances.

It has hitherto been found that nozzles when applied for this form of energy conversion were extremely inefficient. Now in all such nozzles as hitherto constructed I have found that the sides of the nozzle forming the path of increasing area have had no proper relation to the direction of projection of the fluid through the nozzle, that is to say, the direction of flow of the particles of the fluid at high velocity entering the velocity conversion increasing area nozzle were substantially parallel to one another, and the stream did not efficiently fill the nozzle owing to the absence of any lateral force to cause the divergence of flow. I have come to the conclusion that no such force can exist under the given conditions, and after careful investigation of this problem, and many experiments, I have found in fact that a substantial portion of the fluid flows on with but little diminished velocity through the increasing area nozzle. It appears clear therefore, that not only must the path be of increasing area, but the projection of the high velocity fluid entering the increasing area portion of the nozzle must take place on correspondingly divergent lines, so that practically no change of direction or projection is required to be imposed on the fluid from within during compression. This I shall hereinafter call the principle of straight line projection. Conversion then becomes efficient, if these conditions be fulfilled. It must be remembered that this principle is of greater importance in the increasing area parts of such nozzles, although it may also be applied in decreasing area parts when these are used.

My invention consists broadly in the conversion of the kinetic energy of a fluid into potential energy in a nozzle by means of what I have called straight line projection by causing the fluid to flow into the increasing area nozzle along lines corresponding with its divergence.

My invention further consists in the application of the principle of what I have called straight line projection in compressors, pumps and the like.

My invention further consists in a compressor in which a thrower or impeller rotating at high velocity, either simple or velocity compounded, is employed to discharge elastic fluid into a compression nozzle, having a path which is substantially divergent only in virtue of the divergence of the lines of projection of the high velocity fluid, either as directly discharged from the thrower, or as discharged from guides which receive it from the thrower.

Referring now to the accompanying drawings which illustrate my invention and form part of my specification, Fig. 2 shows a sectional elevation of another form to that shown in Fig. 1; Fig. 3 shows a sectional elevation of a third form of nozzle; Figs. 4 and 5 show sections at right angles of a fourth form of nozzle, while Fig. 6 is a detail of the directing guides or vanes shown in Figs. 4 and 5; Figs. 7 and 8 show sectional elevations at right angles of a compressor with inter-radial-tangential projection, while Figs. 12$^a$ and 12$^b$ show part sectional elevations at right angles of a compressor, the particles being projected along the surface of an hyperboloid of revolution. Fig. 17 shows a sectional elevation of a non-return valve constructed according to my invention, while Fig. 18 shows a similar valve provided with an additional valve at the throat.

In the drawings which are to some extent of diagrammatic nature and are not to be taken as working drawings, similar parts are denoted by the same reference symbols.

Figure 1:
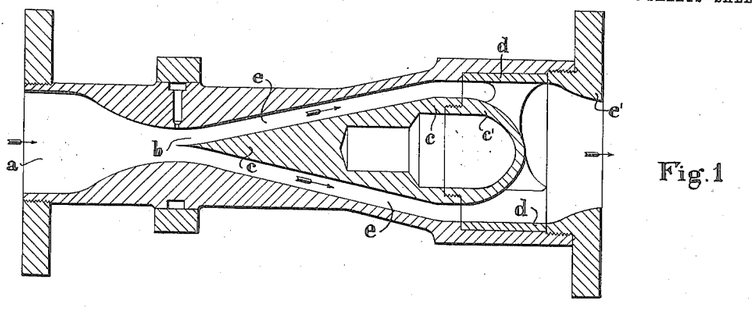
Figure 1 shows a sectional elevation of one form of nozzle constructed according to my invention.

The forms of nozzles which are suitable for working on my new principle fall into four general types. In the first of these, as illustrated in Fig. 1, the entry portion, $a$, is of convergent form although in some cases it may be of approximately parallel form. From the throat, $b$, the walls of the nozzle diverge considerably in the form of a truncated cone. A conical piece, $c$, is attached to a base, $c'$, connected by webs to the ring, $d$, the webs being formed so as to offer the minimum resistance to the flow of fluid. The ring, $d$, is retained in position by the flange, $e'$. The piece, $c$, is disposed in proximity to the throat, and has its sides substantially parallel to those of the nozzle, so as to leave an annular path, $e$, in which the remainder of the energy conversion from velocity to pressure takes place.

The base of the conical piece, $c'$, may be of any convenient form and the continuation of the nozzle walls constructed in any suitable manner for conducting away the fluid from the nozzle.

The apex of the conical piece, $c$, and the shape of the nozzle about the throat is such as to direct the fluid along the proper divergent lines parallel to the straight portions of the sides of the nozzle before conversion is effected in the increasing area part of the nozzle, the straight portions of the nozzle diverging in the direction of flow with respect to the axis of the conical piece, $c$. A path of increasing area is thus formed between the walls of the nozzle and the conical piece, $c$, in which conversion of velocity into pressure is effected.

Figures 2, 3, 8:
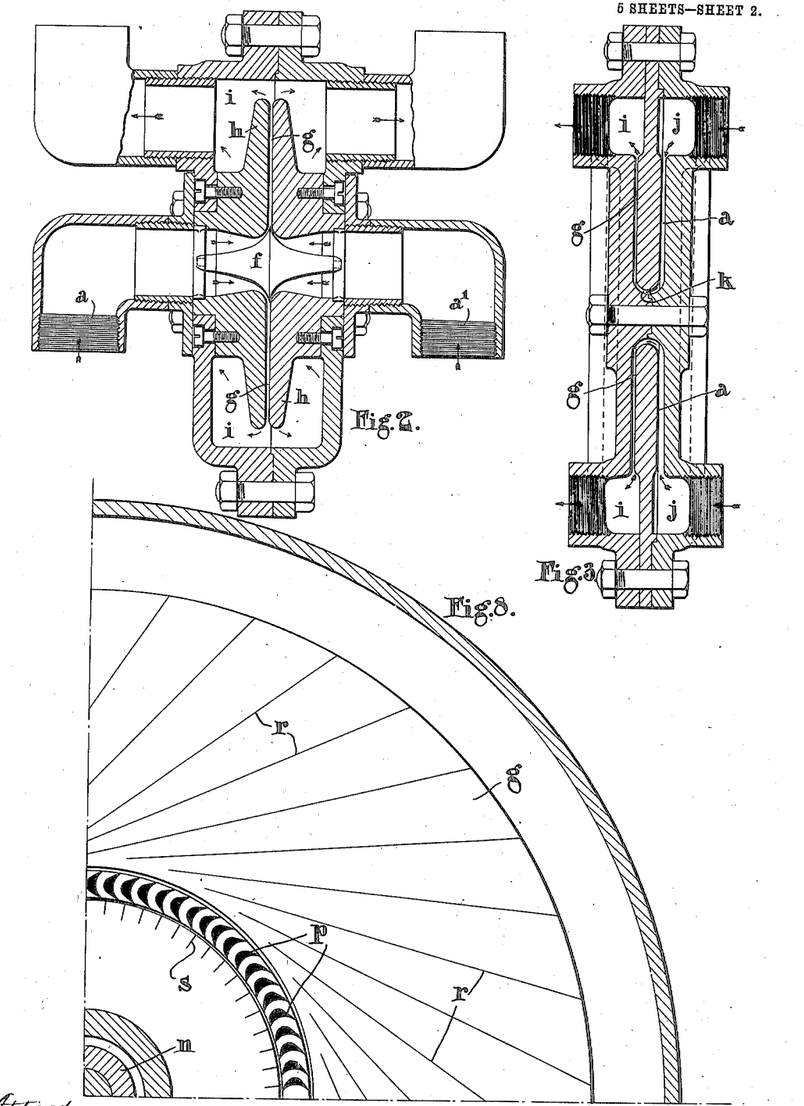

In the second type of nozzle according to one of the simplest forms thereof the fluid is introduced through two oppositely disposed entry portions, $a$, and $a'$, Fig. 2 and is diverted substantially at right angles to its original line of flow by means of a guide, $f$, into the increasing area part, $g$, which in this instance is formed of two disks, $h$, arranged substantially parallel to one another. The discharge into the increasing area part of the nozzle takes place radially the increase of area being obtained by the divergence of the radial lines of flow, as the fluid is projected outward from the center of the nozzle. The fluid from the nozzle is discharged into an annular chamber, $i$, surrounding the conversion part of the nozzle. In some cases the guide piece may be dispensed with, the impact of the opposing jets causing the fluid to be projected into the increasing area part. Again in other cases one of the oppositely disposed entry portions may be dispensed with a suitable guide piece being disposed opposite to the discharge from the remaining entry portion so as to divert the fluid and discharge it radially into the increasing area passage of the nozzle in a similar manner to that before described.

In the third type of nozzle, the entry portion, instead of being of the usual type with axial flow is of the radial or substantially radial flow type the increasing area passage also being of the latter type; one form of this type of nozzle is illustrated in Fig. 3. In this figure, the fluid is discharged from an annular chamber, $i$, to the entry portion, $a$, through which it flows radially toward the center, the entry portion being thus the equivalent of the converging portion of the first type of nozzle hereindescribed. After passing through the entry portion the direction of flow of the fluid is changed at $k$, the fluid being thence led into the increasing area passage, $g$, of the nozzle and passing outward from the center is discharged into the annular chamber, $i$.

Figures 4, 5, 6, 7:
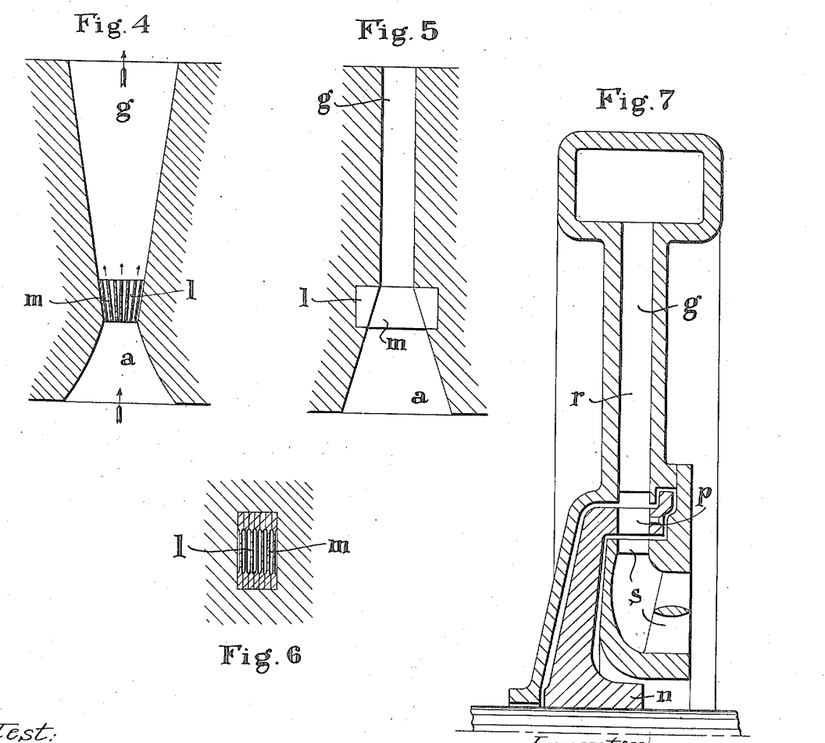

In the fourth type of nozzle directing pieces or guide vanes are disposed at the throat in order that the fluid may be projected in streams corresponding to the divergence of the walls of the increasing area part of the nozzle. One example of a nozzle of this type is shown in Figs. 4, 5 and 6. In these figures the nozzle represented is rectangular in cross-section, the entry portion, $a$, being convergent and the increasing area portion, $g$, divergent. In order to direct the flow of the fluid before conversion begins in the increasing area portion, I arrange between the entry and increasing area portions of the nozzle a portion, $l$, of substantially constant cross sectional area, and into this portion a number of directing pieces, $m$, are introduced. The pieces, $m$, are dispensed with their parallel edges closer at one end than at the other, so that the fluid is projected into the increasing area part of the nozzle in radiating or diverging streams corresponding to the divergence of the nozzle walls. In the example of the nozzle illustrated two of the walls of the increasing area part are parallel to one another while the others diverge toward the delivery end of the nozzle.

In all the forms of nozzles which I have described the path of the fluid through the conversion part of the nozzle is bounded by walls continuous in the direction of flow.

I will now describe various applications of my invention.

In carrying my invention into effect according to one form and as applied by way of example in a fluid compressor, I employ a thrower or impeller, $n$, preferably turbine driven for imparting velocity to the fluid, Figs. 7 and 8, having suitably curved blades, $p$, which are disposed parallel to the axis of the thrower so that they discharge from their outer edges. Surrounding the thrower I arrange the increasing area part, $g$, which is provided with division pieces, $r$, for receiving the flow of fluid in an inter-radial-tangential direction. The division pieces $r$ are adapted to protect the fluid as it is projected into the increasing area part from the disturbance which would otherwise be produced therein on account of the fluid being projected obliquely into zones of increasing pressure. The increasing area portion, $g$, is of circular form with parallel sides, the internal and external diameters thereof being chosen so as to provide the required difference of area to convert the velocity energy of the fluid into desired pressure energy.

The thrower instead of being provided with a single set of running blades may be velocity compounded, i.e. provided with several sets of running and stationary blades, while in other cases oppositely rotating bladed members may be used for imparting the required velocity to the fluid.

The blades of the thrower may preferably be disposed as shown in order to prevent the formation of dead spaces by the action of centrifugal force as the fluid passes therethrough; the passage thus formed through the blades being wider at the entrance than at the delivery side. This, however, would have the effect of forming a path of varying area through the blades, but if it is desired to have a path of constant area the ends of the blades must be inclined to correspond to the desired area. Guide vanes, $s$, may also be disposed in the inlet passages to prevent whirling of the fluid therein and also for directing the fluid on to the moving blades, $p$.

It will be obvious that as the inter radial-tangential path is longer than the corresponding radial one the length of the increasing area portion measured radially in the former case may be somewhat less than in the latter. The division pieces, $r$, which are disposed in the increasing area portion must be made thin as their sole function is to prevent the particles being forced out of their straight line path of projection by passing obliquely into a zone of higher pressure.

In another form of fluid compressor according to my invention, I employ radial projection of the fluid into the increasing area part.

Figure 9:
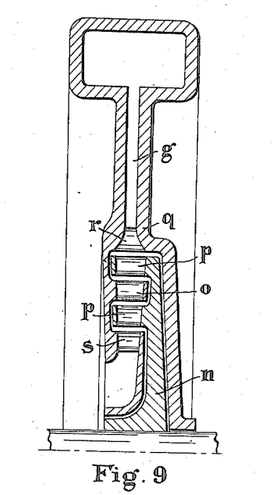
Figs. 9 and 10 show similar views of a compressor with radial projection.
Figure 10:
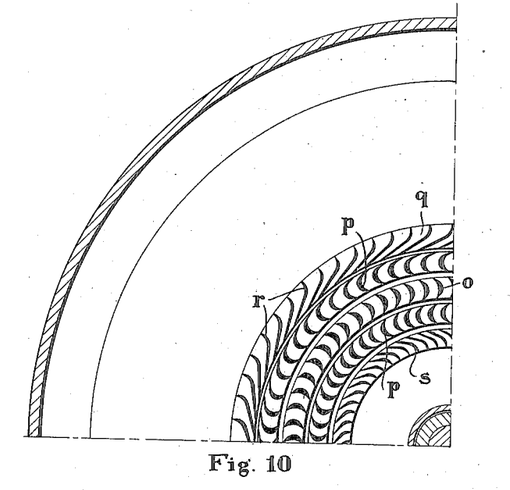

The thrower, $n$, Figs. 9 and 10, is in this case of the velocity compounded type and is provided with suitably curved sets of moving blades, $p$, with a stationary set of blades $o$, interposed between adjacent moving sets, guide vanes $s$ being provided for directing the fluid on to the first set of moving blades. The blades in this example are also disposed parallel to the axis of the thrower so that they discharge from their outer edges. Surrounding the thrower I arrange the receiving chamber $q$, in which the fluid is directed by division pieces, $r$, forming paths of substantially constant area and which cause the fluid to be projected into the increasing area part $g$, in a substantially radial direction. The fluid passes from the receiving chamber into the increasing area portion which is of circular form with parallel sides, the diameters of the chamber being chosen as before to obtain the required conversion of the velocity of the fluid into pressure.

Figures 11, 12:
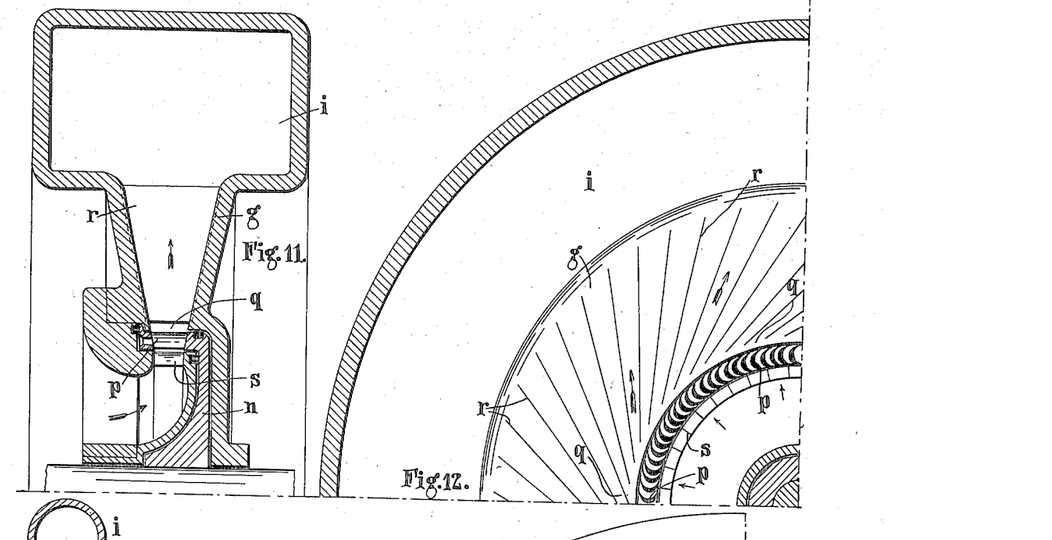
Figs. 11 and 12 show part sectional elevations at right angles of a modified form of compressor to that shown in Figs. 7 and 8.

In another form of fluid compressor such as I have illustrated in Figs. 11 and 12, I arrange the increasing area portion $g$, so that the path of the fluid is divergent in directions at right angles to each other, the divergence in one direction being due to increasing radial distance, while that in the other is due to the divergent path in which the fluid is projected. The thrower, $n$, in this case is designed so as to project the fluid along both lines of divergence, which may be attained either by forming the blades of the thrower curved in two directions, or by arranging the blades so as to form a wider path at their inlet than their outlet edges, the ends of the individual blades being inclined or straight so as to maintain a path of constant or variable area therethrough as desired.

Figure 12A:
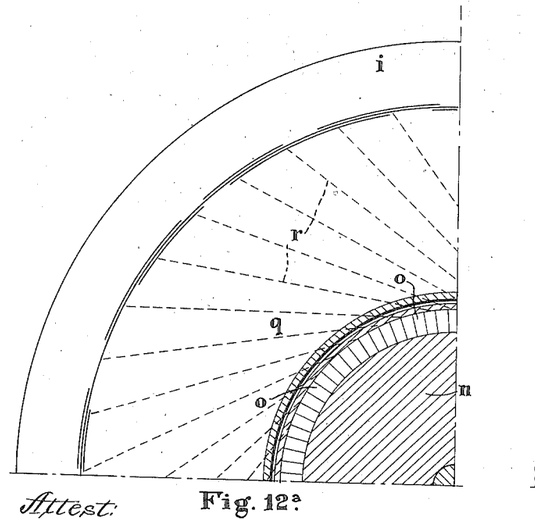
Figure 12B:
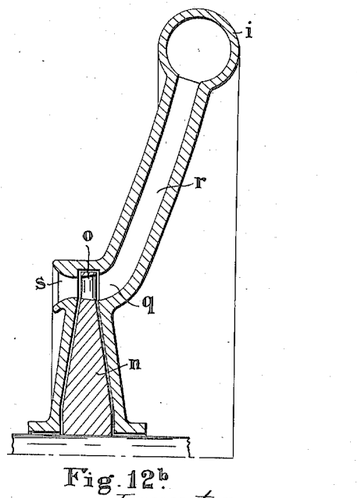

In another form of fluid compressor such as I have shown in Figs. 12$^a$ and 12$^b$, I may employ a thrower having radial blades adapted to project the fluid along the surface of a hyperboloid of revolution, and if it is desired to obtain a path of increasing area the blades may be suitably curved in one or more planes.

The blades of the thrower may thus be disposed axially or radially or even inclined at any convenient angle, the disposition of the guide vanes and energy conversion part being correspondingly arranged.

Figure 13:
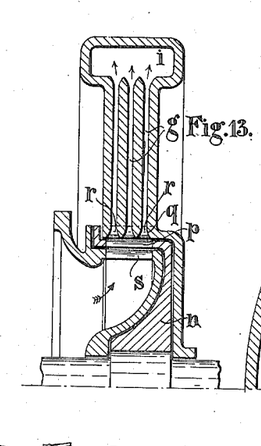
Figs. 13 and 14 show part sectional elevations at right angles of a compressor with multiple nozzles.
Figure 14:
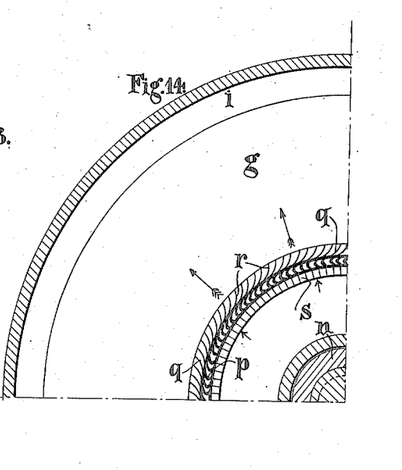

A compressor having multiple nozzles is illustrated in Figs. 13 and 14. In these figures the thrower $n$, has axially disposed blades, $p$ and delivers fluid into a series of receiving chambers, $q$, provided with guide vanes, $r$. The chambers, $q$, are of constant cross sectional area and deliver the fluid radially into the increasing area portions, $g$, the sides of which are substantially parallel to one another for the greater part of their length, but diverge as shown at the junction part with the annular chamber, $i$. The increase of area in the conversion part is obtained as before by the increase of area due to increasing radial distance from the center.

Figure 15:
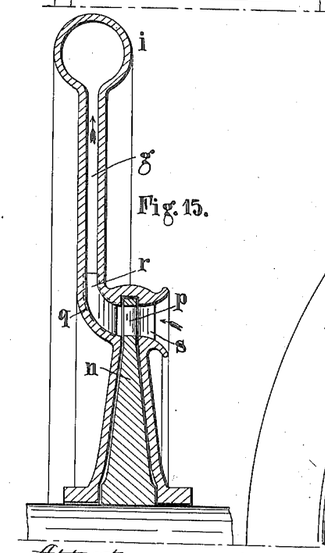
Figs. 15 and 16 are part sectional elevations at right angles of a compressor having radially disposed blades.
Figure 16:
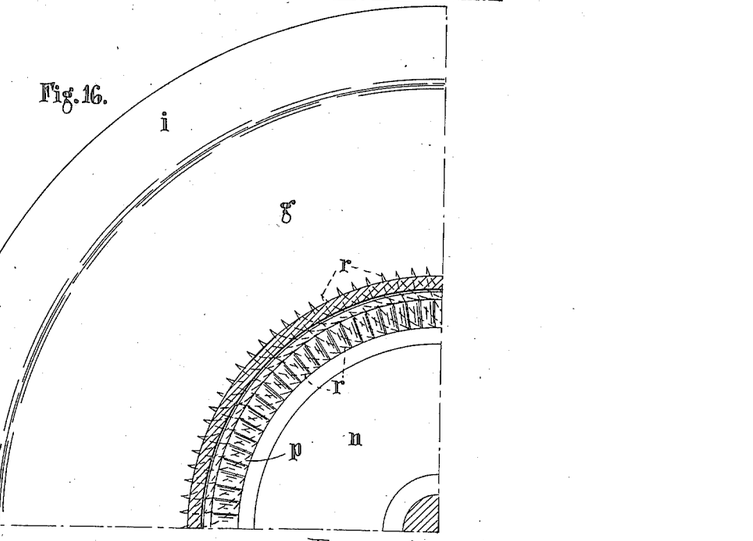

Again in other circumstances when I may employ a thrower with radially disposed blades for delivering the fluid to the conversion part, one form of such a compressor is shown in Figs. 15 and 16. In this form as before guide vanes, s, are provided for directing the fluid in to the blades, p, of the thrower, n, which discharges into a receiving chamber, q, having guide vanes, r, disposed therein so that the area therethrough is approximately constant. The formation of the path through the guide vanes, r, is such that the path of the fluid is changed from an axial into a radial direction. The increasing area portion, q, has walls substantially parallel to each other and discharges into an annular chamber, i. The receiving chamber, q, may in some cases have the guide vanes so disposed that projection takes place in an inter-radial-tangential path the guide vanes as before described preventing disturbance in the flow of the fluid.

In some cases the division pieces, r, may be dispensed with and the fluid projected into the increasing area portion the sides of which are parallel or approximately parallel to one another. As in this case the path of the particles is approximately that of an equiangular spiral, the radial length of the nozzle will be greater than an equivalent one provided with division pieces.

In all the above cases of compressors I have been dealing with compression ratios not exceeding 1.9 to 1 but if this ratio is to be exceeded the nozzle must be provided with an entry portion or receiving chamber of diminishing section in the direction of flow.

In constructing compressors to deal with a compression ratio of more than 1.9 to 1 it is preferable to employ velocity compounding of the thrower, the only additional feature being that the energy conversion part first diminishes in area in the direction of flow. A compressor, therefore, adapted for a compression ratio of more than 1.9 to 1 and constructed in a similar manner to the form herein described with reference to Figs. 9 and 10 has a velocity compounded thrower, which delivers fluid to a nozzle the receiving chamber of which has converging sides so that the sectional area of the chamber diminishes at increasing radial distances from the center. In this section of diminishing area guide vanes are disposed which cause the fluid to be projected practically in a radial direction into the conversion part of the nozzle, the walls of which part are practically parallel. The increase of area in this part is obtained as before by the increasing sectional area at increasing radial distances.

The other forms of compressor before described may also be similarly modified to obtain a greater compression ratio than 1.9 to 1 in a similar manner.

The length of path in the decreasing area portion and in the increasing area portion may preferably be proportional to the energy conversion in each portion.

In another form of compressor I may employ a nozzle of the third type herein indicated with a velocity compounded thrower which projects the fluid radially inward through passages of constant area thence through the converging part of the nozzle which is formed between circular walls placed substantially parallel to one another, the convergence being effected by the decreasing area of the passage as the fluid is projected radially toward the center. The fluid is received by connecting guides at the extremity of the convergent part nearest the center, which guides may be of substantially constant area and cause the path of the fluid to be diverted through an angle of 180°. After being discharged from the connecting guides the fluid enters the diverging part of the nozzle which consists of a chamber placed preferably side by side with the convergent part, and having substantially parallel walls. In the latter chamber the remainder of the velocity to pressure conversion is effected in an increasing area portion as before.

In all cases the throwers which I prefer to use have symmetrical blades which are however disposed so as to afford a wider passage for the working fluid at their entering edges than at their delivery edges, so as to insure that the jet will be as nearly solid as possible, the throwers acting in conjunction with guide vanes fixed in the inlet passage so as to prevent whirling therein. It is also advisable to provide a space without guide vanes between the thrower and the divisions in the receiving chamber or increasing area part, so that the individual streams issuing from the thrower may be united and the fluid projected into the conversion part as a solid jet with equal velocity throughout its volume. Further, the blades of the thrower may be provided if necessary with an efficient packing so that advantage may be taken of any change of pressure which is found to occur even in the case of blades which afford a path of constant area for the fluid passing therethrough.

It will be seen that a segment of a circular compressor such as is described above may be used with less advantage without departing from my invention. Where I have indicated the use of constant sectional areas for the redirection of the fluid in this specification, I may make the areas not quite constant but slightly increasing in the direction of flow in order to compensate for the frictional losses which produce a diminution in the velocity of the fluid.

In single stage compressors according to the best forms of my invention substantially all the velocity to pressure conversion is effected in the nozzle or nozzles and not substantially in the thrower or in the passage receiving the fluid from the nozzle, the arrangement being such that the residual velocity in the fluid after conversion has been effected is small so that a high efficiency is attained. In some cases, however, nozzles constructed according to my invention may be used in conjunction with throwers in which part of the conversion is effected though with less advantage than those in which no part of the conversion is effected in the thrower.

In the case of isothermal compression to high pressure I prefer to make the compressor multi-stage and arrange that each compression nozzle has only to deal with a small compression ratio, say 1.5 to 1. I further arrange that at each stage the velocity imparted to the fluid by the thrower is as nearly as possible converted into pressure in the corresponding nozzle, the minimum residual velocity being left in the fluid which will transfer it through directing passages and coolers to the next thrower or to the inlet guide vanes of the same.

It is important to keep the compression ratio dealt with in each nozzle small in order that the intercooling between stages may be effected. The intercoolers may be of the surface condenser type or in some cases cooling may be effected by water injection, the water being drained off at each stage and rejected or cooled and used over again.

I prefer to use the forms of compression nozzles which while consistent with the above conditions will present the minimum amount of surface so that the skin friction losses may be reduced to the smallest possible amount.

In some cases I may prefer to leave a certain amount of residual velocity in the fluid leaving a nozzle and direct the fluid by means of guide vanes or the like into the next nozzle or to a thrower delivering to the next nozzle.

My new types of nozzles may also be applied in apparatus for dealing with inelastic fluids, although the gain to be obtained is less. It is to be observed however, that in dealing with inelastic fluids no converging part is required in the nozzle and further the thrower may be of the usual type in which a substantial amount of pressure is acquired before the nozzle conversion begins.

Although I prefer a parallel sided path where the projection is in a radial or inter-radial and tangential direction only and the increase of areas obtained by a natural divergence at right angles to such path still the sides of the path may be slightly divergent without much loss of efficiency. The same principle may also be applied to valves and in Fig. 17 I have illustrated a non-return valve in which this principle is embodied. It will be evident that this valve is generally speaking a nozzle of the first type which I have described in which the conical piece, $c$, is made movable. The conical piece, $c$, is attached by way of a rod, $u$, to a piston, $v$, working in a cylinder, $w$, formed in the part, $y$, which is held in position by the valve chest cover, $x$, suitable stops or abutments being provided to limit the motion of the cone. A spindle, 5, having suitable operating gear is provided for regulating the lift of the valve so that the valve operates as an ordinary screw down valve. When fully open an annulus is left between the conical piece, $c$, and the corresponding conical wall of the valve chest the two conical surfaces being preferably of equal slope. The inlet to this annulus is so shaped that its cross sectional area is constant, or in other words the inlet serves merely to change the direction of the fluid to that corresponding to the conical slopes without altering its velocity. After passing in straight lines between the conical surfaces according to the principle explained above the fluid is then directed to the outlet, $z$, of the valve chest which is suitably shaped in conjunction it may be with the cylinder or an appropriate extension thereof forming part of the chest cover to form a passage of substantially constant cross section.

Figures 17, 18:
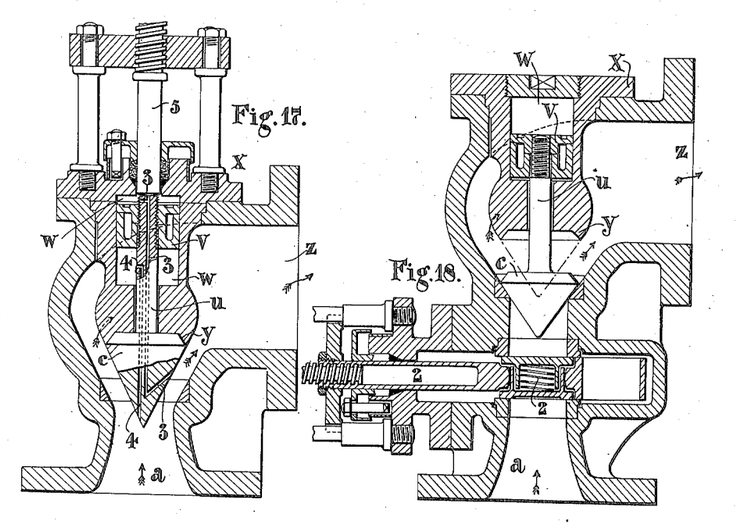

In cases where the axis of the valve is vertical for instance and the valve is held open by the pressure of the fluid flowing past it I may assist this action by forming suitable passages, 3, in the body of the conical piece, and inclined at a sharp angle to its slope. The passages, 3, communicate with the space above the piston, $v$ while passages, 4, inclined in opposite directions to the passages, 3, communicate with the underside of the piston.

When the fluid is passing through the valve in the proper direction, a pressure is exerted on the underside of the piston by the passages, 4, and a suction on the upper side of the piston by the passages, 3, so that the rush of fluid past the valve in the above direction tends to hold the valve in the open position. Should, however, a reversal of direction of the fluid take place the above action is reversed and the closure of the valve assisted.

In some cases a main valve, 2, (Fig. 18) may be placed in the nozzle throat in order to provide additional control to that of the valve, $c$.

I prefer to shape the cylinder, $w$, or its extension to form part of the inner cone as shown the remainder of which is provided by the non-return valve proper, but in other cases I may arrange the valve so as to form the whole of the inner core.

Hand gear may be provided when desired so that the valve may be operated as an ordinary screw down valve, and as above stated, an additional valve may be disposed in the nozzle throat.

Again in other cases I may arrange the conical piece in the outlet nozzle of a straight way valve such as I have described in my patent specification No. 21082/04 (British) the apex of the conical piece being disposed in proximity to the throat and the conical piece being attached to the walls of the passage-way by webs formed so as to offer the minimum resistance to the flow of fluid.

I may also apply my improved nozzle to metering devices of the Venturi type generally and particularly to those metering devices described or referred to in my patent application No. 8887 of 1906 (British).

My improved nozzle may also be applied in ejector condensers or in any form of injector to improve the efficiency of conversion; thus, for example, when applied to the feeding of boilers, a given quantity of water can be introduced with a lower consumption of steam or on the other hand the water may be forced in at a higher temperature.

Further as a turbine is generally speaking a reversed compressor it will be evident that many of the improvements hereinbefore described with reference to the latter class of machines may also be applied to the former and I wish the claims for the latter class of machines to include the application of my improvements also to the former. It will be seen that my invention may be applied also with advantage in all other injectors, ejectors and like apparatus in which velocity to pressure conversion is required.

What I wish to emphasize as the essential feature of my invention is that the particles must be projected into the increasing area part along naturally divergent lines or direction must be given to the path of the particles along the desired divergent lines before conversion of velocity into pressure in the increasing area portion commences to be effected.

Having now described my invention what I claim as new and desire to secure by Letters Patent is:—

1. A process for converting the kinetic energy of a fluid into potential energy consisting in imparting velocity to the fluid and leading it through a continuous conduit of increasing area in straight divergent lines.

2. A process for converting the kinetic energy of a fluid into potential energy consisting in imparting velocity to the fluid and leading it through a continuous convergent-divergent nozzle, the path of the fluid in said divergent portion of said nozzle being in straight divergent lines.

3. A process for converting the kinetic energy of a fluid into potential energy consisting in projecting the fluid in a stream divergent in two dimensions and receiving the projected fluid in a continuous increasing area portion bounded by walls which provide a correspondingly divergent path to the stream of fluid projected thereinto.

4. A process for converting the kinetic energy of a fluid into potential energy consisting in imparting velocity to the fluid in a series of stages and leading it through a continuous conduit of increasing area in straight divergent lines.

5. In combination, a nozzle having a continuous increasing area portion together with means for leading fluid through said increasing area portion in straight divergent lines.

6. In combination, a nozzle having a decreasing area portion; an increasing area portion; together with means for leading fluid passing through the increasing area portion of said nozzle in straight divergent lines.

7. In combination a nozzle having a decreasing area portion; an increasing area portion; means disposed in said nozzle for directing the flow of fluid through said increasing area portion in straight divergent lines together with means for controlling the flow of fluid through said nozzle.

8. In combination a nozzle having a decreasing area portion; an increasing area portion; means for directing the flow of fluid through said increasing area portion in straight divergent lines together with means co-acting with said directing means for controlling the flow of fluid through said nozzle.

9. In combination, a nozzle having a decreasing area portion; an increasing area portion; means for directing the flow of fluid through said increasing area portion in straight divergent lines, said means including a movable conical member; means co-acting with said directing means for controlling the flow of fluid through said nozzle together with means dependent on the fluid passing through said nozzle for maintaining said conical member in the correct position relatively to the direction of flow.

10. In combination, a casing, a conduit of decreasing area in said casing; a conduit of increasing area in said casing; a conduit of constant cross-sectional area connecting said conduits of increasing and decreasing area; a valve in said conduit of constant cross sectional area together with a conical member for directing the flow of fluid in said increasing area in straight divergent lines.

11. In combination a casing having a leading in portion of convergent form in the direction of flow of the fluid, and a leading out portion, together with a valve co-acting with said leading out portion to form therein passages of constant and increasing cross-sectional area in the direction of flow, the path of the fluid in said increasing area portion being in straight divergent lines.

12. In combination a casing having a conduit for fluid therein, and a movable conical member co-acting with the walls of said conduit to form passages of constant and increasing cross-sectional area, the path of the fluid in said increasing area passage being in straight divergent lines.

In testimony whereof, I affix my signature in presence of two witnesses.

SEBASTIAN ZIANI DE FERRANTI.

Witnesses:
  ALBERT HALL,
  WILLIAM DUNCAN DAVIDSON.